Jan. 30, 1962 J. CHAUVIN 3,018,837
TRACTION MECHANISM
Filed July 11, 1958 6 Sheets-Sheet 1

Inventor:
John Chauvin
By Roy Griffith Jones
Attorney

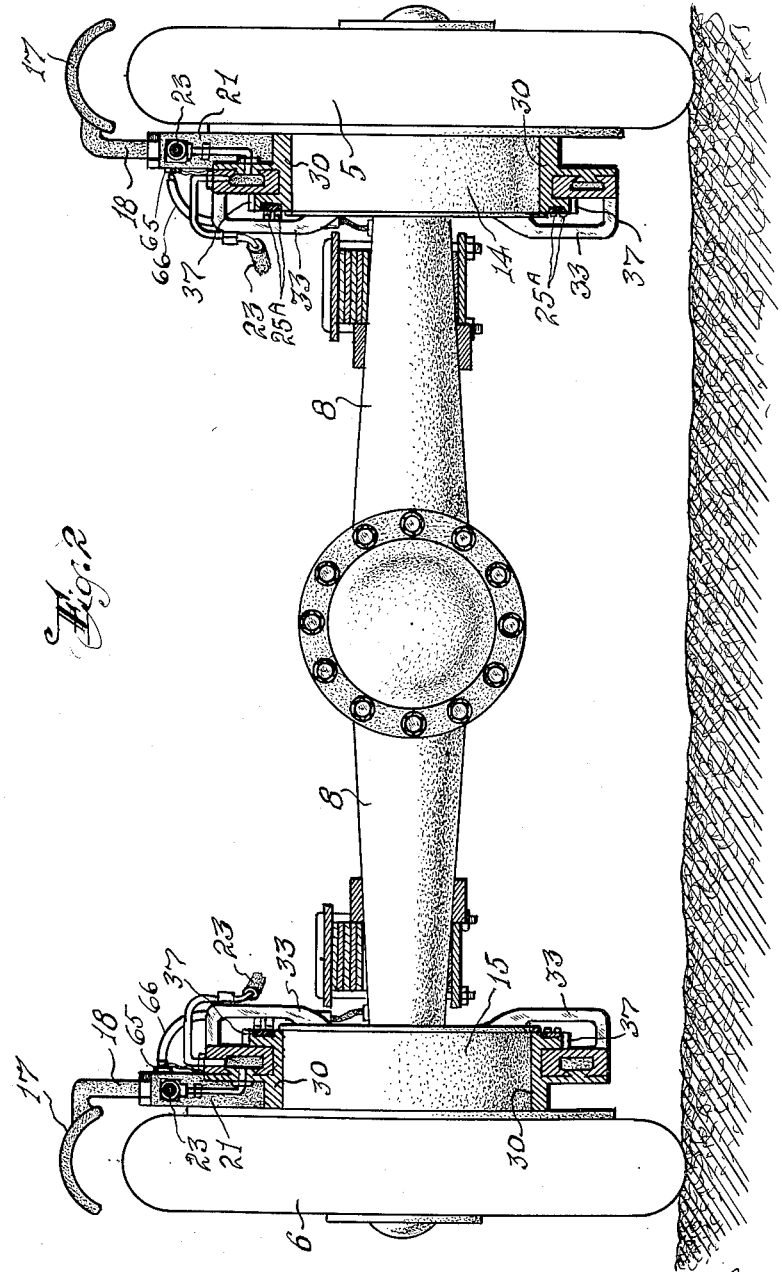

Jan. 30, 1962  J. CHAUVIN  3,018,837
TRACTION MECHANISM
Filed July 11, 1958  6 Sheets-Sheet 3
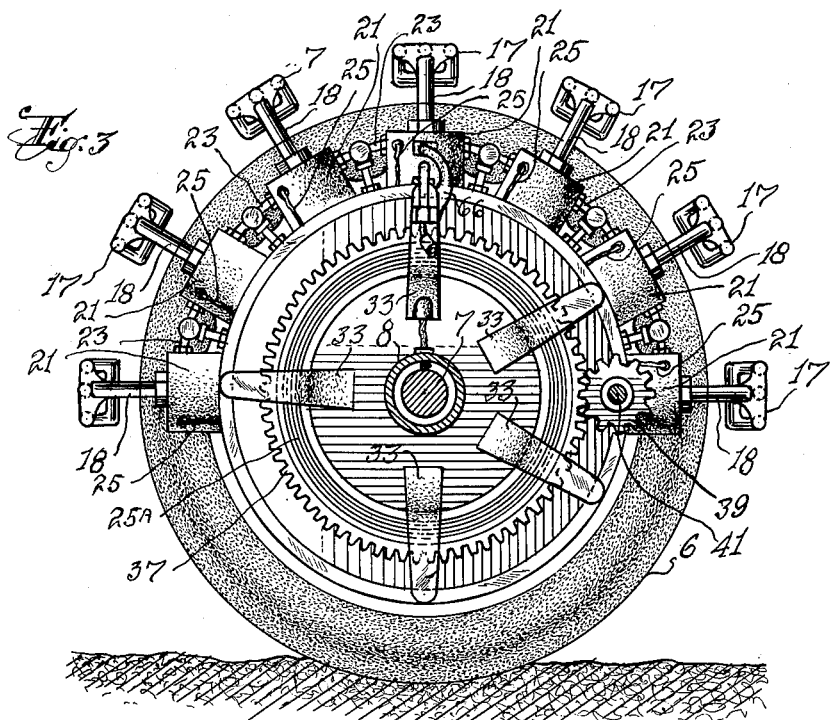
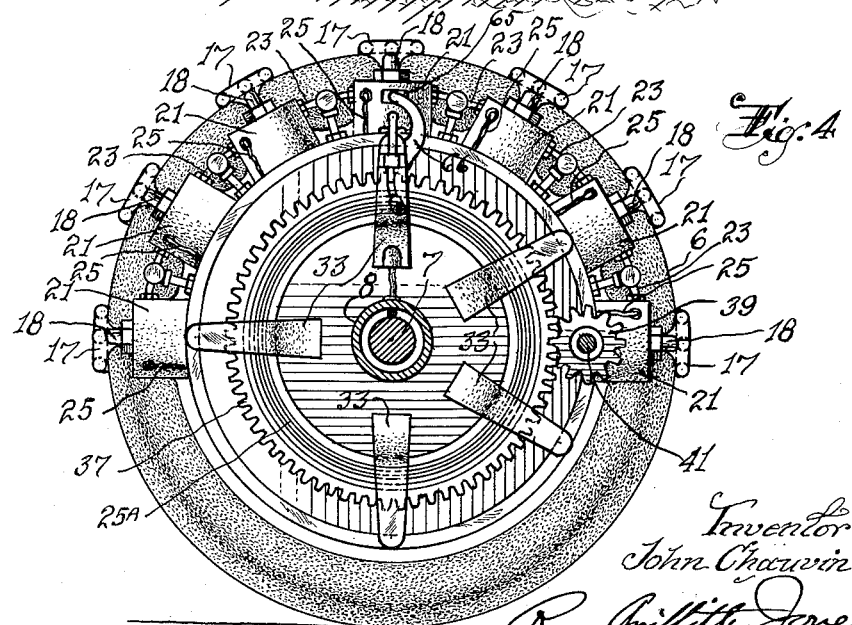
Inventor:
John Chauvin
By Roy Griffith Jones
Attorney Inventor:
John Chauvin
By Roy Griffith Jones
Attorney

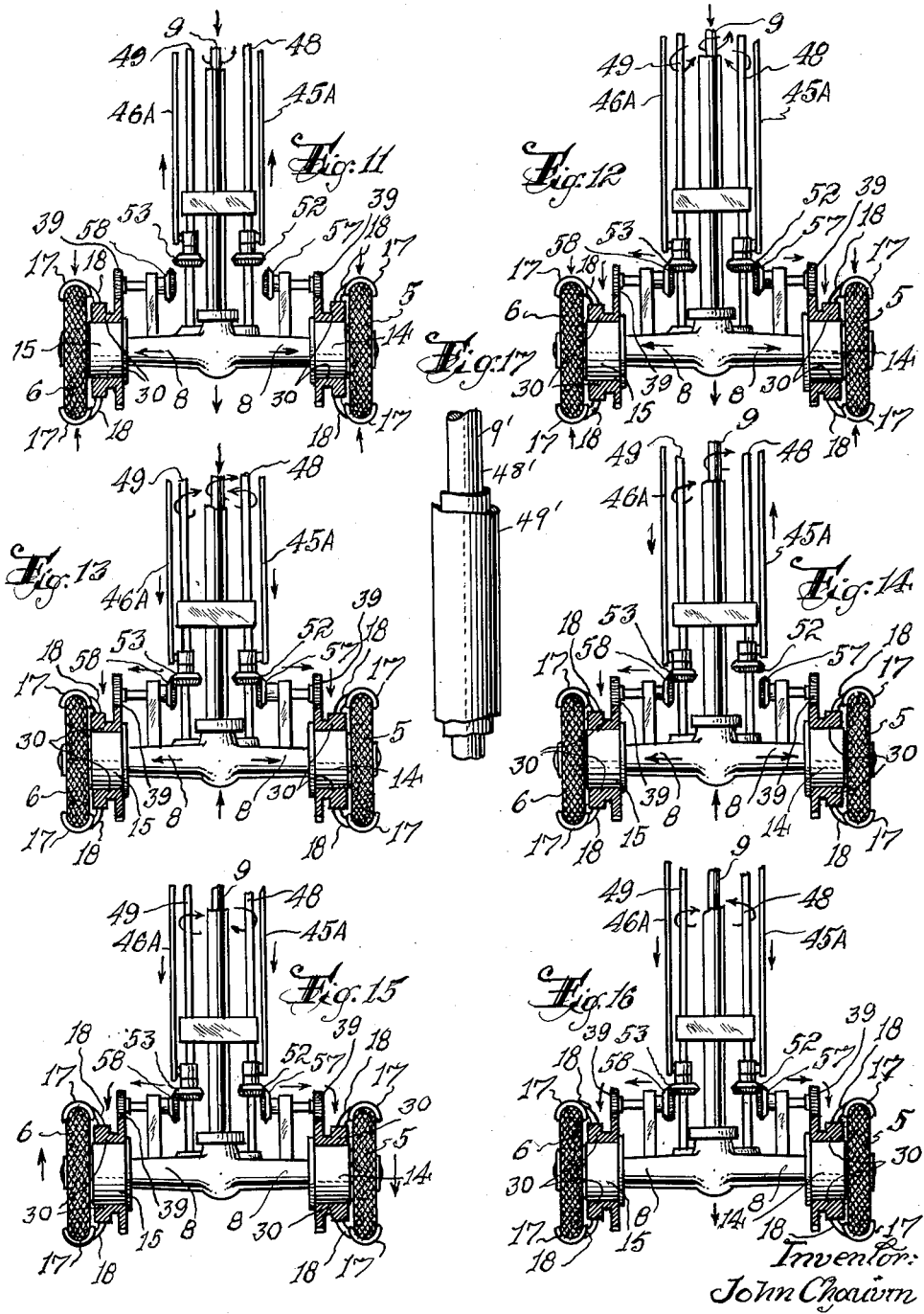

Jan. 30, 1962 J. CHAUVIN 3,018,837
TRACTION MECHANISM
Filed July 11, 1958 6 Sheets-Sheet 6
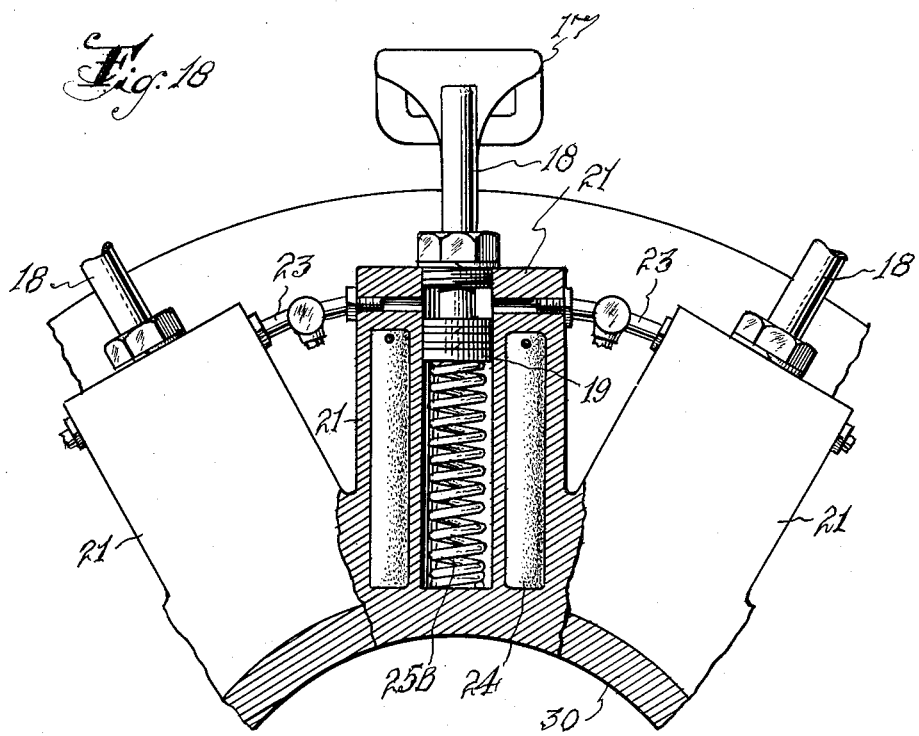
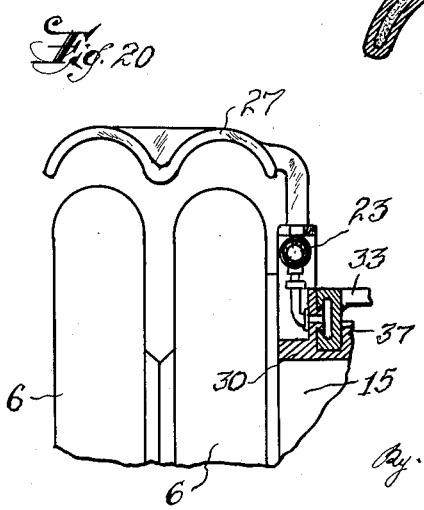
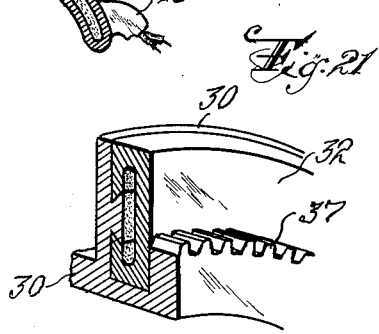
Inventor:
John Chauvin
Roy Griffith Jones
Attorney 3,018,837
TRACTION MECHANISM
John Chauvin, 67 Roosevelt Ave., West Orange, N.J., assignor of small percentages to various assignees
Filed July 11, 1958, Ser. No. 747,862
4 Claims. (Cl. 180—7)

This invention relates to added traction mechanism for automotive vehicles, for use in conditions making travel difficult.

This invention provides various means for achieving added traction, which means may be used either singly or in selected combinations, and may be used, at least in part, on airplanes as well as ground vehicles.

An important feature of the invention is that wheels and tires may be put on and taken off without interfering with the traction means; the latter being structurally independent of the wheels.

The mechanism includes a number of spaced radially disposed, arcuate traction shoes which are not normally in contact with the tires, but which may be applied thereto simultaneously by the driver of the vehicle, preferably by means of hydraulic pressure, to securely hold the shoes to the tires. The shoes are spaced only part way around the drive wheels and are preferably self-releasable when the applied hydraulic pressure is released, although a reversing hydraulic pressure may be used. The shoes and associated adjacent mechanism rotate only when in engagement with the wheel tires, being otherwise stationary.

Another important feature of the invention is the provision of means for applying a much larger turning leverage or torque to the wheels when needed.

A further feature is that the drive wheels may be made to turn in opposite directions at the same time, or power may be applied to either drive wheel alone, with the other drive wheel not turning, to effect a turning of the vehicle out of difficult ruts.

Another advantage of the invention is that it may be used to act on dual or twin wheels, employed on heavy trucks.

Another important feature is that the traction shoes may be used as chocks to lock a vehicle in place, as to prevent the vehicle from creeping when there is vibrating equipment on it, or to hold it on a steep incline.

The drawings illustrate the invention, and in these:

FIG. 2 is a rear end view of FIG. 1, partly in section;

FIG. 3 is an elevational view of the inner side of a drive wheel and brake drum and of part of the added traction mechanism mounted on the brake drum, the traction shoes being shown out of contact with the wheel tire;

FIG. 4 is a view similar to FIG. 3 but shows the shoes clamped on the wheel tire;

FIG. 11 is a plan view of drive wheels with driving mechanism therefor and also added traction mechanism, as the vehicle moves backward, certain parts of the latter mechanism being in non-operating position;

FIG. 12 is similar to FIG. 11 but shows certain parts of the added traction mechanism in operating position;

FIG. 13 is similar to FIG. 12 but shows the vehicle moving forward;

FIG. 14 is similar to FIG. 13 but shows part of the added traction mechanism acting on only one of the two wheels, the vehicle pulling forward;

FIG. 15 is similar to FIG. 14 but shows part of the added traction mechanism turning one of the wheels forward and the other backward, the main drive shaft being in neutral;

FIG. 16 is similar to FIG. 15 but shows part of the added traction mechanism acting on both wheels, in the same sense, to move the vehicle backwards, the main drive shaft being inactive;

FIG. 17 is a fragmentary plan view of the main drive shaft in telescopic relation with two auxiliary drive shafts, the latter being part of the added traction mechanism;

FIG. 18 is a fragmentary elevational view of the traction shoe mechanism;

FIG. 19 is a vertical section of a traction shoe which may be heated electrically;

FIG. 20 is a fragmentary end view of a twin or dual wheel, with a traction shoe and operating mechanism for the shoe; and FIG. 21 is a fragmentary perspective view of a gear wheel and adjacent parts employed in the invention.

Figure 1:
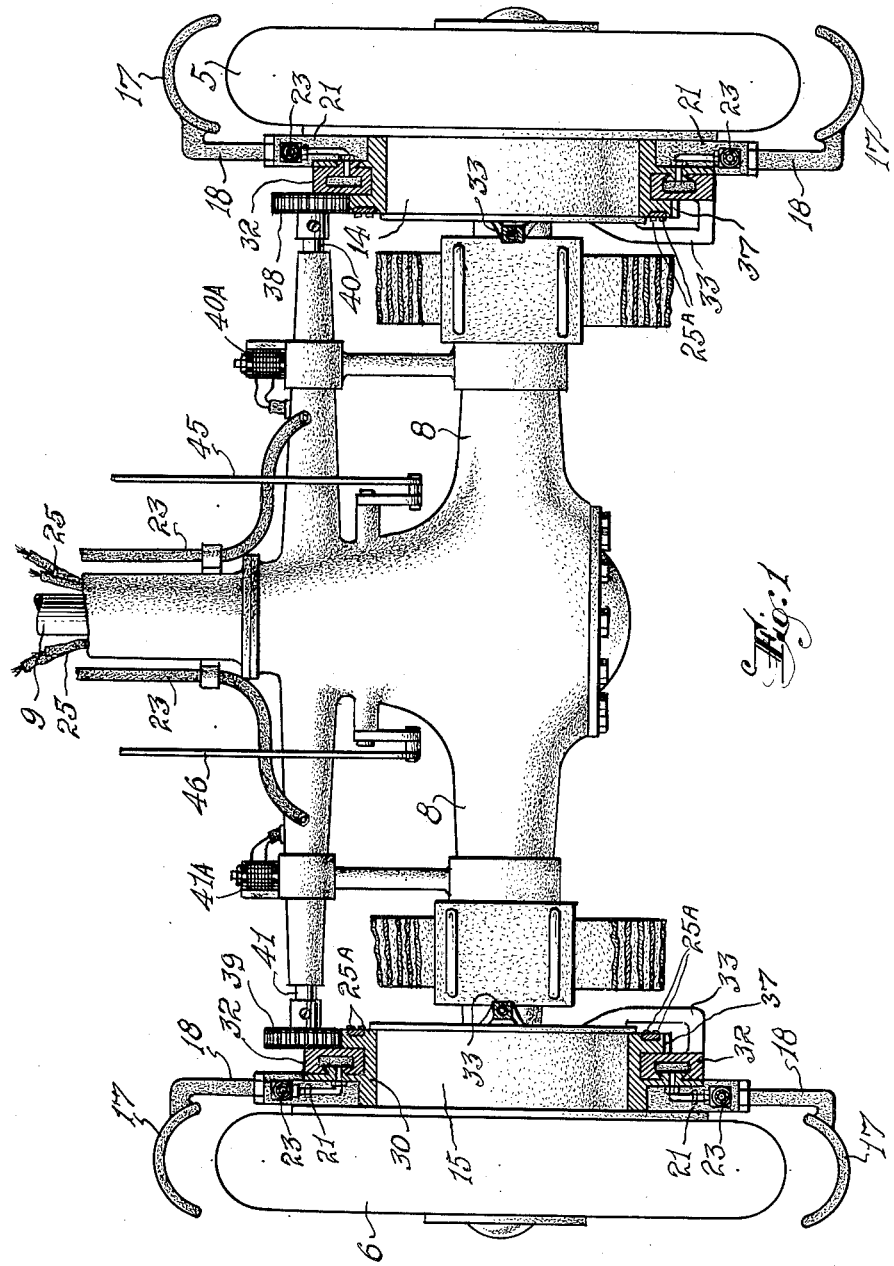
FIG. 1 is a plan view, partly in section, of the drive wheels and associated mechanism, with the added traction mechanism applied thereto.
Figure 5:
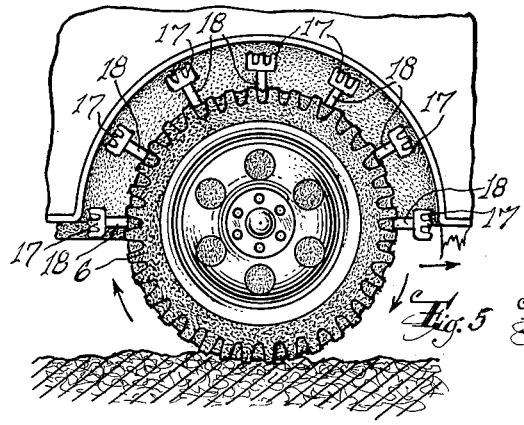
FIG. 5 is an outside elevation of a drive wheel, showing the traction shoes out of contact with the wheel tire and above the upper half of the tire.

Referring to the drawings for a more detailed description, the numerals 5 and 6 designate the right and left rear or drive wheels of the vehicle, viewed from the rear and as shown in FIGS. 1 and 2. The drive wheel axle is numbered 7 and its housing 8. The main drive shaft 9 connects with the rear axle through a differential, as usual. Secured to the inner faces of wheels 5 and 6 are brake drums 14 and 15 respectively. Arcuate traction shoes 17 (FIGS. 1 and 2) are radially disposed over the upper half of each wheel (FIGS. 3–10) and are movable rectilinearly into and out of engagement with the wheel tires, and are secured to piston rods 18 of pistons 19; the latter are hydraulically operated to press the shoes into secure engagement with the tires. The shoes of both wheels are operable simultaneously, from the driver's seat of the vehicle, through the hydraulic system, which extends from the front, back to the drive wheels, said system including a cylinder 21 (FIG. 18) for each of the mentioned pistons, and tubes 23 for the hydraulic fluid reaching each cylinder. When the hydraulic pressure is released, a coiled spring 25B in each cylinder (FIG. 18) releases the shoes. The cylinders each have an annular space 24 so that they may be heated, if desired, either electrically or from the engine exhaust or in any other suitable manner. Electric wires 25 for such heating are shown in FIGS. 1, 3 and 4, being fed through circular rings 25A and sliding contacts. The traction shoes 17 may also be hollow, for heating purposes, as shown in FIG. 19, being therein indicated as adaptable for electrical heating. In FIG. 20, I show a twin or dual shoe 27 which is adapted to engage the dual or twin wheels shown. The mentioned cylinders of each wheel are carried on an annular supporting member 30, which is slidably mounted on and around each brake drum. Held slidably in an annular groove in each of the members 30 is an annular ring 32 (FIGS. 1, 2 and 21), which rings 32 are secured to the axle housing by several hollow radial arms 33 (FIGS. 1–4). The rings 32 are hollow, to receive the hydraulic fluid for distribution to the mentioned cylinders, and are held to the members 30 by dove tail tongue and groove connections, as shown in FIGS. 1, 2 and 21.

A gear wheel 37 (FIGS. 3, 4 and 21) is formed on the periphery of each of the members 30, adjacent the inner edge thereof, for respective engagement with gears 38 and 39. The latter gears are mounted on the outer ends of shafts 40 and 41 (FIG. 1) respectively. The shafts 40 and 41 are clutch-connected to the main shaft 9 to be driven thereby, while the links 45 and 46 are to operate the clutch on the rear axle, and electrical controls 40A and 41A are employed to connect and disconnect shafts 40 and 41 from shaft 9 by any means known in the art.

Instead of taking power from the main drive shaft, I show, in FIGS. 11–16, a modified form of the invention, in which two auxiliary shafts are used, these to be driven directly by the engine, and used either in addition to the main drive shaft, or without the latter, as may be necessary or desirable, as when the main shaft may be inoperative, for example, but, more importantly, to obtain maximum tractive effort to one or both wheels, either backward or forward, by the application of power to the gears 37. In FIGS. 11–16, I show the main drive shaft, with two auxiliary drive shafts, one on each side of the main shaft, but I may put the three shafts in concentric relation, as shown in FIG. 17.

FIGS. 11–16 show auxiliary drive shafts 48 and 49, one on each side of main drive shaft 9 and parallel therewith, and adapted by suitable gear shifts to be driven by the engine separately or together, and with or without operation of shaft 9, and also in opposite or the same directions so as to move one wheel forward and the other backward, as will under certain circumstances be desirable. To effect these functions, the auxiliary shafts 48 and 49 have slidable bevel gears 52 and 53 (FIGS. 11–16) at their rear ends, which bevel gears may connect and disconnect respectively with gears 55 and 56 respectively, the latter gears mounted on the inner ends of cross shafts 57 and 58 respectively. The gears 52 and 53 are operated by the links 45A and 46A.

FIG. 11 shows the main drive shaft alone moving the vehicle backwards, the clutches of the auxiliary drive shafts 48 and 49 being disengaged. FIG. 12 shows these clutches engaged, so that both the main and the auxiliary shafts are moving the vehicle backwards. FIG. 13 shows the vehicle moving forward by the power of the main and auxiliary shafts. In FIG. 14, the clutch of shaft 48 is disengaged, the vehicle moving forward by power from the main shaft 9 and the auxiliary shaft 49, to concentrate torque more on the left wheel. In FIG. 15, the main drive shaft is idle, the auxiliary clutches are engaged, but the auxiliary shafts are turning to effect opposite turning of the right and left wheels, one forward and the other backward, the better to get the vehicle out of a rut under certain conditions. In FIG. 16, the main shaft is idle and the auxiliary shafts are moving the vehicle backwards. It will thus be seen that the equipment is adaptable to a variety of conditions which might be encountered thereby to successfully travel over difficult terrain. FIG. 17 shows that the main and auxiliary shafts may be concentrically disposed, the shafts in this figure being numbered 9', 48' and 49'.

Figure 6:
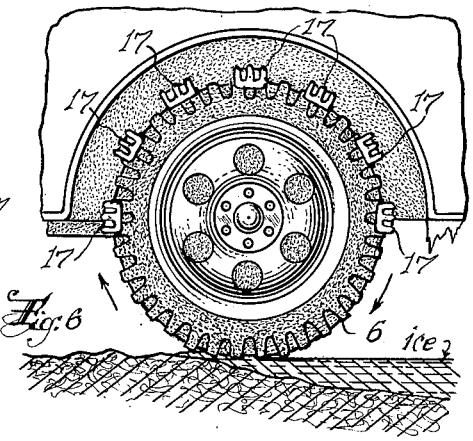
FIG. 6 is a view similar to FIG. 5, but shows the shoes gripping the tire and beginning to turn with the wheel.
Figure 7:
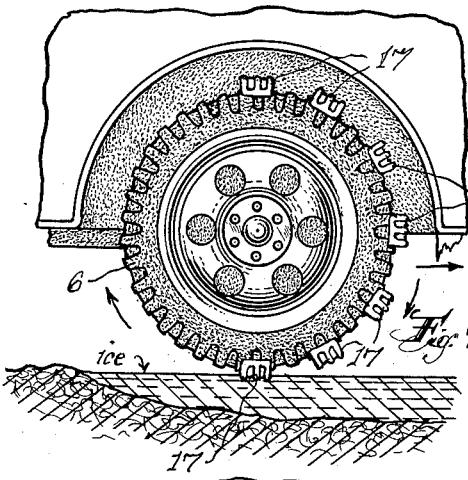
FIG. 7 shows a further turning of the wheel, with the shoes beginning to contact the road.
Figure 8:
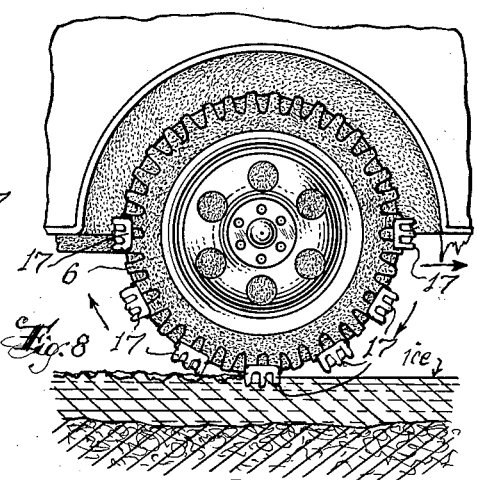
FIG. 8 shows a still further turning of the wheel, the shoes now being on the lower half of the tire.
Figure 9:
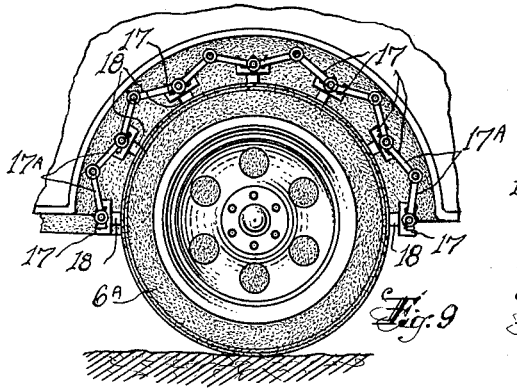
FIGS. 9 and 10 show a modification in which the traction shoes are linked together, and respectively shows the shoes free of and applied to the wheel tire.
Figure 10:
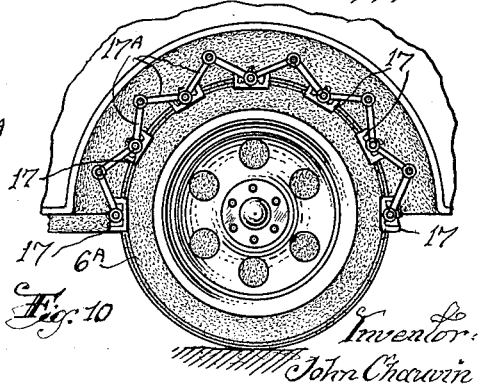

As shown in FIGS. 1, 2 and 3, the traction shoes are independent of the wheels and do not turn when not clamped thereto, thereby permitting the wheels and/or tires to be put on and taken off without interference with or by the traction mechanism, which is a valuable feature. When the traction shoe engage the tires, the shoes turn with the wheels, as shown in FIGS. 6–8. When the shoes are to be disengaged from the tires, the hydraulic pressure is to be released when the shoes are on the upper halves of the wheels. Provision is made to indicate to the driver that the shoes are in such position. To provide such indication, there is an electric circuit for the middle or top shoe only (FIGS. 3 and 4), which circuit is closed when said middle shoe is at the top of the wheel, to light a lamp visible to the driver, or to give an audible signal. Before releasing the shoes, the vehicle should be slowed down so that the shoes will not pass their upper position. The said circuit is closed when a small metallic plate 65 (FIGS. 2, 3 and 4), on the cylinder of the middle shoe, makes sliding contact with a pair of wires, with terminals, which emerge from tube 66.

What is claimed is:

1. In an automotive vehicle, the combination of drive wheels, axle housing, a drive axle in the housing, a brake drum fixedly secured to the inner side of each driving wheel, a supporting structure rotatably mounted on each of said drums, a plurality of radially disposed shoes mounted on each supporting structure over only the upper part of each wheel and adapted to move radially to and from the treads of the wheel tires in straight line motion, and means for actuating said shoes, a ring gear mounted on each of said supporting structures and of large radius relative to the drive axle radius, to provide a relatively large torque, a pinion engaging each ring gear, and auxiliary drive shafts for turning said pinions.

2. The combination specified in claim 1, in further combination with the main drive shaft of the vehicle and clutches for separately connecting and disconnecting the auxiliary shafts to the main drive shaft.

3. The combination specified in claim 1, in further combination with the main drive shaft of the vehicle, a pair of drive shafts adapted to be driven by the vehicle engine independently of each other and also of the main drive shaft and operatively and detachably connected one to each of said auxiliary shafts.

4. The combination specified in claim 3, in which the main drive shaft and the said pair of shafts are concentric.

References Cited in the file of this patent

UNITED STATES PATENTS

| | | |
|---|---|---|
| 1,251,607 | Wilson | Jan. 1, 1918 |
| 1,283,877 | Olszewski | Nov. 5, 1918 |
| 1,787,608 | Ansell | Jan. 6, 1931 |
| 2,126,961 | Hodgkinson | Aug. 16, 1938 |
| 2,205,689 | Fischer | June 25, 1940 |
| 2,532,309 | Hoffman | Dec. 5, 1950 |